(12) United States Patent
Sowizral et al.

(10) Patent No.: US 6,765,571 B2
(45) Date of Patent: Jul. 20, 2004

(54) USING A MASTER CONTROLLER TO MANAGE THREADS AND RESOURCES FOR SCENE-BASED RENDERING

(75) Inventors: Henry Sowizral, Bellevue, WA (US); Kevin Rushforth, San Jose, CA (US); Doug Twilleager, Campbell, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 588 days.

(21) Appl. No.: 09/759,598

(22) Filed: Jan. 11, 2001

(65) Prior Publication Data

US 2002/0089508 A1 Jul. 11, 2002

Related U.S. Application Data

(63) Continuation-in-part of application No. 09/668,493, filed on Sep. 22, 2000
(60) Provisional application No. 60/175,580, filed on Jan. 11, 2000, and provisional application No. 60/156,054, filed on Sep. 24, 1999.

(51) Int. Cl.[7] .............................................. G06T 17/00
(52) U.S. Cl. ...................... 345/420; 345/522
(58) Field of Search ................ 345/420, 421, 345/440, 694, 853, 522; 715/500.1, 514–516

(56) References Cited

U.S. PATENT DOCUMENTS

| | | | |
|---|---|---|---|
| 5,657,479 A | 8/1997 | Shaw et al. | |
| 5,896,139 A | 4/1999 | Strauss | |
| 5,956,039 A | 9/1999 | Woods et al. | |
| 6,266,053 B1 * | 7/2001 | French et al. | 715/500.1 |
| 6,282,697 B1 | 8/2001 | Fables et al. | |
| 6,301,579 B1 | 10/2001 | Becket | |
| 6,373,489 B1 | 4/2002 | Lu et al. | |
| 2001/0030647 A1 | 10/2001 | Sowizral et al. | |
| 2002/0063713 A1 | 5/2002 | Sowizral et al. | |

OTHER PUBLICATIONS

Rohlf, John and James Helman, "IRIS Performer: A High Performance Multiprocessing Toolkit for Real–Time 3D Graphics," *SIGGRAPH 94*, Orlando, Florida, Jul. 24–29, 1994, pp. 381–394.

Arikawa et al., "Dynamic LoD for QoS Management in the Next Generation VRML," © 1996 IEEE, pp. 24–27.

"Dealer Instruction Processing Unit Governor–Use of Thread Structure and Directed Acyclic Graph to Creast Dlist/Slist," IBM Technical Disclosure Bulleting, vol. 36, No. 06A, Jun. 1993, pp. 579–581.

*The Virtual Reality Modeling Language*, International Standard ISO/IEC 14772–1:1997, © 1997 The VRML Consortium Inc., pp. 1–236.

International Search Report, application No. PCT/US 00/26081, mailed Mar. 13, 2001.

*The Java 3D™ API Specification*, Version 1.2, Apr. 2000, Chapters 1–5, 7, 9, and 13.

* cited by examiner

*Primary Examiner*—Mark Zimmerman
*Assistant Examiner*—Lance W. Sealey
(74) *Attorney, Agent, or Firm*—Meyertons Hood Kivlin Kowert & Goetzel, P.C.; Jeffrey C. Hood

(57) ABSTRACT

A system and method for rapid processing of scene-graph-based data and/or programs is disclosed. In one embodiment, the system may be configured to utilize a scene graph directly. In another embodiment, the system may be configured to generate a plurality of structures and threads that manage the data originally received as part of the scene graph. The structures and threads may be configured to convey information about state changes through the use of messaging. The system may include support for messaging between threads, messaging with time and/or event stamps, epochs to ensure consistency, and ancillary structures such as render-bins, geometry structures, and rendering environment structures. A master control thread may be utilized to manage the allocation of resources and the timing of thread execution.

26 Claims, 9 Drawing Sheets

Case 1: One Canvas3D on one Screen3D

Case 2: Two Canvas3D's on one Screen3D

Case 3: Two Canvas3D's on two Screen3D's

USING A MASTER CONTROLLER TO MANAGE THREADS AND RESOURCES FOR SCENE-BASED RENDERING

CROSS REFERENCE TO RELATED APPLICATIONS

This application claims the benefit of U.S. Provisional Application No. 60/175,580, filed on Jan. 11, 2000.

This application is a continuation-in-part of U.S. application Ser. No. 09/668,493 filed on Sep. 22, 2000, which claims the benefit of U.S. Provisional Application No. 60/156,054 filed on Sep. 24, 1999.

BACKGROUND OF THE INVENTION

1. Field of the Invention

This invention relates generally to the field of computer graphics and, more particularly, to graphics systems and software that manage and render three-dimensional graphics data.

2. Description of the Related Art

A computer system typically relies upon its graphics system for producing visual output on the computer screen or display device. Early graphics systems were only responsible for taking what the processor produced as output and displaying it on the screen. In essence, they acted as simple translators or interfaces. Modern graphics systems, however, incorporate graphics processors with a great deal of processing power. They now act more like coprocessors rather than simple translators. This change is due to the recent increase in both the complexity and amount of data being sent to the display device. For example, modern computer displays have many more pixels, greater color depth, and are able to display more complex images with higher refresh rates than earlier models. Similarly, the images displayed are now more complex and may involve advanced techniques such as anti-aliasing and texture mapping.

As a result, without considerable processing power in the graphics system, the CPU would spend a great deal of time performing graphics calculations. This could rob the computer system of the processing power needed for performing other tasks associated with program execution and thereby dramatically reduce overall system performance. With a powerful graphics system, however, when the CPU is instructed to draw a box on the screen, the CPU is freed from having to compute the position and color of each pixel. Instead, the CPU may send a request to the video card stating "draw a box at these coordinates." The graphics system then draws the box, freeing the processor to perform other tasks.

Generally, a graphics system in a computer (also referred to as a graphics system) is a type of video adapter that contains its own processor to boost performance levels. These processors are specialized for computing graphical transformations, so they tend to achieve better results than the general-purpose CPU used by the computer system. In addition, they free up the computer's CPU to execute other commands while the graphics system is handling graphics computations. The popularity of graphical applications, and especially multimedia applications, has made high performance graphics systems a common feature of computer systems. Most computer manufacturers now bundle a high performance graphics system with their systems.

Since graphics systems typically perform only a limited set of functions, they may be customized and therefore far more efficient at graphics operations than the computer's general-purpose central processor. While early graphics systems were limited to performing two-dimensional (2D) graphics, their functionality has increased to support three-dimensional (3D) wire-frame graphics, 3D solids, and now includes support for three-dimensional (3D) graphics with textures and special effects such as advanced shading, fogging, alpha-blending, and specular highlighting.

To take advantage of the new capabilities of both graphics systems and modern CPUs in general, graphics application program interfaces ("APIs") have been developed. An API is a set of routines, protocols, and/or tools for building software applications. An API attempts to simplify the task of developing a program by providing building blocks needed by programmers to create their application. One example of a popular API is Microsoft Corporation's Win32 API.

While graphics API have been successful in allowing programmers to rapidly develop graphical applications, the recent increase in the complexity of the scenes being rendered is placing ever greater demands on the CPUs and graphics systems that are executing the applications. Traditionally, when tasks become too computationally intensive for a single CPU, multiple CPU systems are used. These multiple CPU systems utilize parallel processing to divide the computations among two or more processors. However, typical graphics APIs are not well suited to allow parallel processing, particularly over a network. Thus, a system and method for efficiently managing the creation, updating, and rendering of a complex scene is needed. In particular, a system and method capable of being implemented in an API and capable of supporting distributed processing in a networked setting is also desired.

SUMMARY OF THE INVENTION

The problems identified above may at least in part be solved by a system and method for rapid processing of scene graph-based data as descried herein. In one embodiment, the system generate a parallel structure for the scene graph-based data. The parallel structure may include both objects and threads. Advantageously, the system may utilize a parallel structure for rendering and thereby avoid repeated traversals of the scene graph in its hierarchy (i.e., tree) form. This parallel structure may be implemented in an API such that it is effectively unseen by graphics application programmers, who continues to use the scene graph structure to create graphics applications.

In one embodiment, the system may be configured to utilize a scene graph directly. In another embodiment, the system may be configured to utilize a scene graph as a source for ancillary structures. The ancillary structures may aid the system in rendering and executing the scene-graph-based program. The system may also include support for messaging between threads and objects, messaging with time and/or event stamps, epochs to ensure consistency, and ancillary structures such as render-bins, geometry structures, and rendering environment structures.

A computer program is also contemplated. In one embodiment, the computer program comprises a plurality of instructions configured to receive a scene graph and traverse the scene graph to generate a plurality of structures and threads corresponding to the scene graph. The scene graph may include information representing a plurality of three-dimensional objects. The scene graph may also include a number of different types of data, including, behavior data for the three-dimensional objects, sound data, haptic data (e.g., force-feed back data) appearance data, geometry data, environmental data (e.g., lighting, fog), and other data. Each structure may be an object that manages selected data from the scene graph, and the plurality of threads may be executable to render one or more frames corresponding to the scene graph. In some embodiments the threads may be configured to generate messages to specify state changes, and the messages can be multicast to multiple structures or unicast to a single structure. Each structure may have a corresponding update thread configured to update the structure. One of the parallel structures created is preferably a render bin that is configured to receive and store references to particular geometry data that is to be rendered in the render bin. The render bin may have one or more render threads associated with it, thereby enabling parallel rendering utilizing multiple processors.

Advantageously, each structure may be configured to manage (and optionally optimize) its own data. Thus one structure may manage all transform data, and may optimize multiple transforms by collapsing them together.

As noted above, a method for managing and rendering a scene graph is also contemplated. In one embodiment, the method may include generating a scene graph, wherein the scene graph comprises information representing a plurality of three-dimensional objects; and traversing the scene graph to generate a parallel set of structures and threads corresponding to the scene graphs, wherein each structure comprises an object that manages selected data from the scene graph, and wherein the plurality of threads are executable to render one or more frames corresponding to the scene graph. The method may be implemented in software, hardware, or a combination thereof.

Advantageously, one of the threads created may be a master control thread configured to schedule the execution of the other threads. The master control thread may be configured to accomplish this scheduling by defining a current epoch. The current epoch may be defined by a minimum clock value and a maximum clock value. In some embodiments, the master control thread may be configured to schedule a particular thread for execution only if the particular thread has received a message within the current epoch or a message having a timestamp that falls within the current epoch. For example, the master control thread may be configured to schedule a particular thread for execution only if the particular thread has received a message having a counter value that falls within the current epoch. The master control thread may be used to ensure that all messages older than the current epoch are processed before the current epoch begins. The master control thread may also be configured to manage which threads can be run in parallel and the allocation of CPU resources. Thus, a master control thread may be used to advantageously manage the efficient and parallel execution of threads in order to render scene-graph based graphics data.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
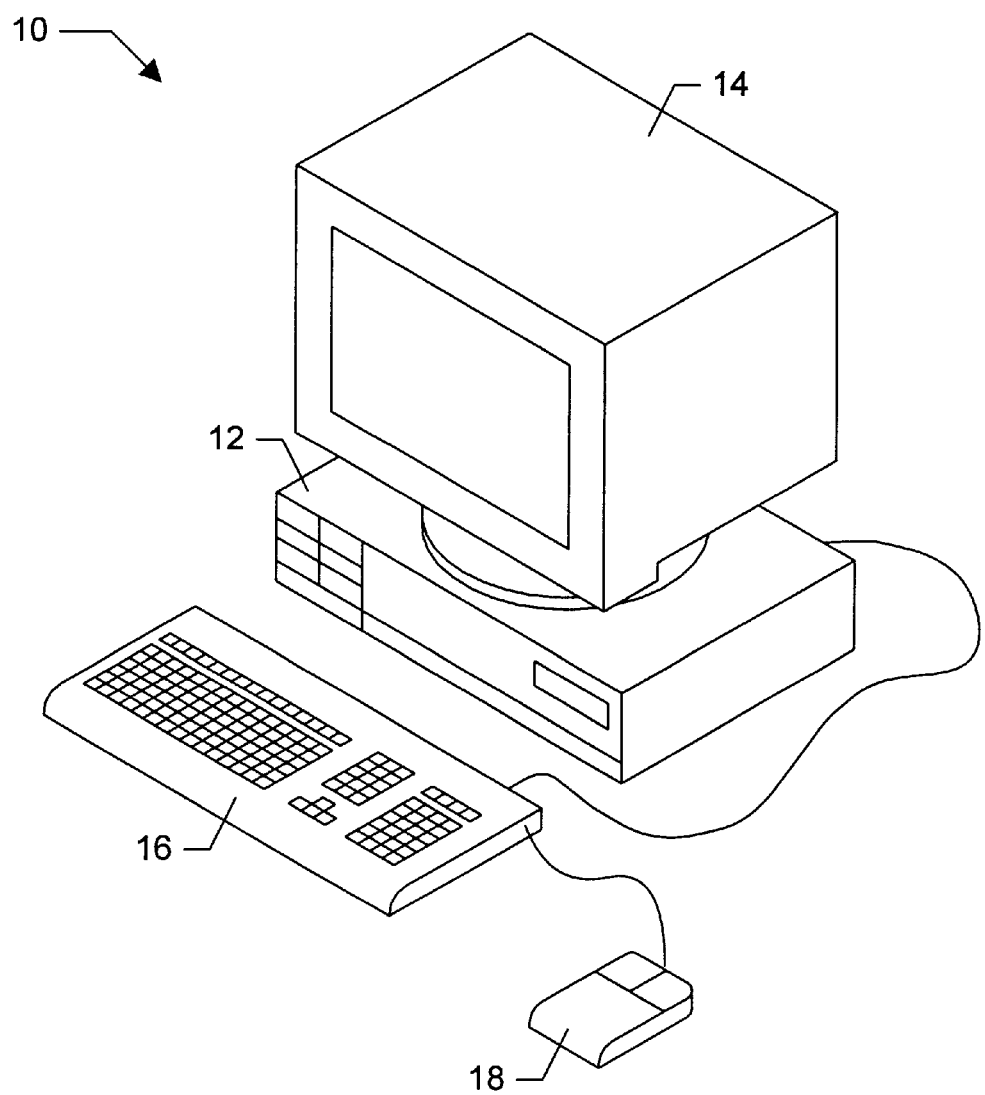
FIG. 1 illustrates one embodiment of a computer system that may be used to implement the system and method described herein.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. The word "may" is used in this application in a permissive sense (i.e., having the potential to, being able to), not a mandatory sense (i.e., must). Similarly, the word include, and derivations thereof, are used herein to mean "including, but not limited to."

DETAILED DESCRIPTION OF SEVERAL EMBODIMENTS

Computer System—FIG. 1

Referring now to FIG. 1, one embodiment of a computer system 10 that may used to implement the system and method described above is illustrated. The computer system may be used as the basis for any number of various systems, including a traditional desktop personal computer, a laptop computer, a network PC, an Internet appliance, a television, including HDTV systems and interactive television systems, personal digital assistants (PDAs), and other device which displays 2D and or 3D graphics.

As shown in the figure, computer system 10 comprises a system unit 12 and a video monitor or display device 14 coupled to the system unit 12. The display device 14 may be any of various types of display monitors or devices (e.g., a CRT, LCD, or gas-plasma display). Various input devices may be connected to the computer system, including a keyboard 16 and/or a mouse 18, or other input device (e.g., a trackball, digitizer, tablet, six-degree of freedom input device, head tracker, eye tracker, data glove, body sensors, etc.). Application software may be executed by the computer system 10 to display 3D graphical objects on display device 14. The application software may be stored in memory, read from a server using a network connection, or read from a storage medium such as a computer diskette, CD-ROM, DVD-ROM, or computer tape.

Figure 2:
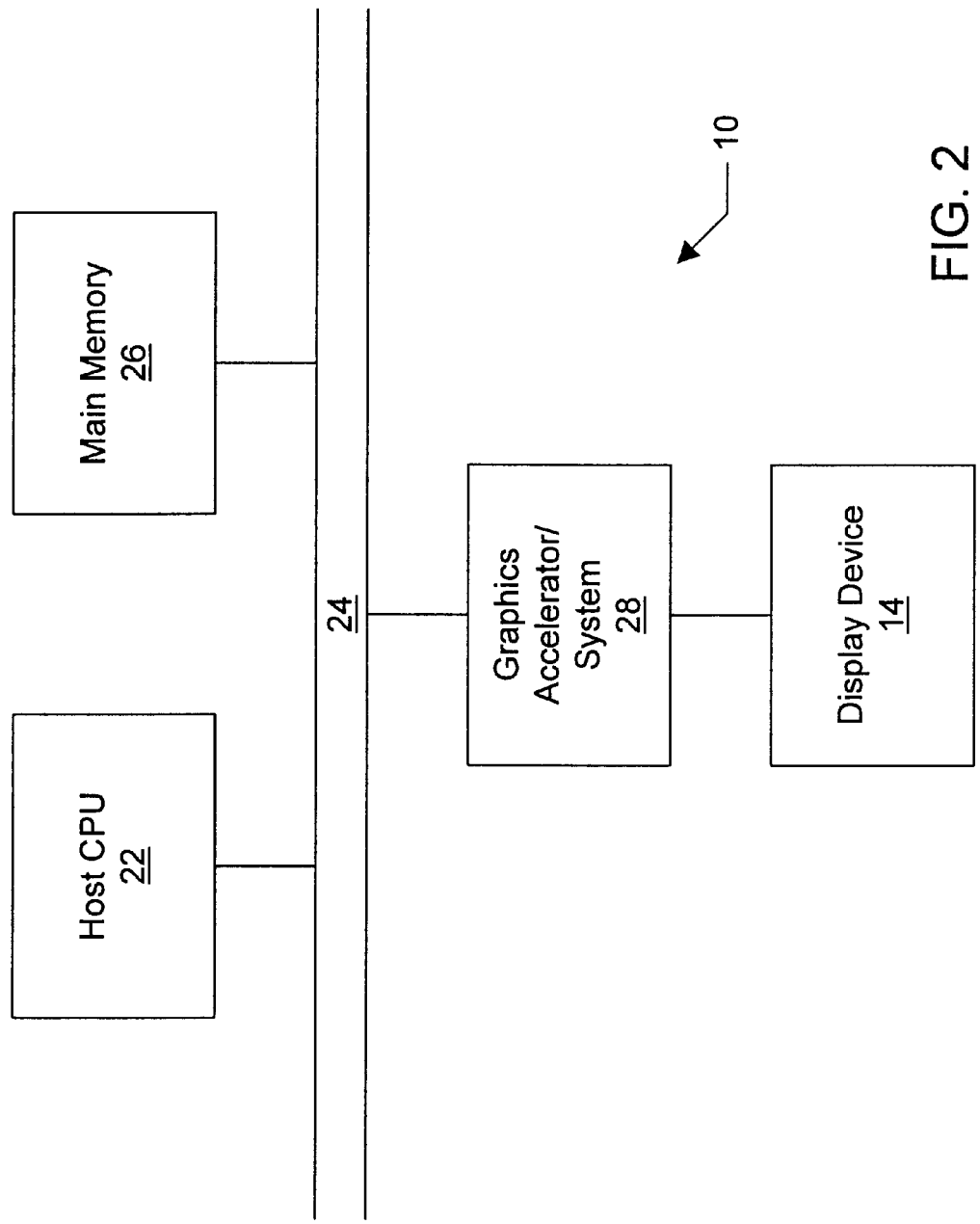
FIG. 2 is a simplified block diagram of the computer system of FIG. 1.

Computer System Block Diagram—FIG. 2

Referring now to FIG. 2, a simplified block diagram illustrating one embodiment of the computer system of FIG. 1 is shown. Elements of the computer system that are not necessary for an understanding of the present invention are not shown for convenience. As shown, the computer system 10 includes a central processing unit (CPU) 22 coupled to a high-speed memory bus or system bus 24. A system memory 26 may also be coupled to high-speed bus 24.

Host processor 22 may comprise one or more processors of varying types, e.g., microprocessors, multi-processors and CPUs. The system memory 26 may comprise any combination of different types of memory subsystems, including random access memories, (e.g., static random access memories or "SRAMs", synchronous dynamic random access memories or "SDRAMs", and Rambus dynamic access memories or "RDRAM", among others) and mass storage devices. The system bus or host bus 24 may comprise one or more communication or host computer buses (for communication between host processors, CPUs, and memory subsystems) as well as specialized subsystem buses.

A 3D graphics system or graphics system 28 according to the present invention is coupled to the high-speed memory bus 24. The 3D graphics system 28 may be coupled to bus 24 by, for example, a crossbar switch or other bus connectivity logic. It is assumed that various other peripheral devices, or other buses, may be connected to the high-speed memory bus 24. It is noted that the 3D graphics system may be coupled to one or more of the buses in computer system 10 and/or may be coupled to various types of buses. In addition, the 3D graphics system may be coupled to a communication port and thereby directly receive graphics data from an external source, e.g., the Internet or a network. As shown in the figure, display device 14 is connected to the 3D graphics system 28 comprised in the computer system 10.

Host CPU 22 may transfer information to and from the graphics system 28 according to a programmed input/output (I/O) protocol over host bus 24. Alternately, graphics system 28 may access the memory subsystem 26 according to a direct memory access (DMA) protocol or through intelligent bus mastering.

A graphics application program conforming to an application programming interface (API) such as OpenGL or Java 3D may execute on host CPU 22 and generate commands and data that define a geometric primitive (graphics data) such as a polygon for output on display device 14. As defined by the particular graphics interface used, these primitives may have separate color properties for the front and back surfaces. Host processor 22 may transfer these graphics data to memory subsystem 26. Thereafter, the host processor 22 may operate to transfer the graphics data to the graphics system 28 over the host bus 24. In another embodiment, the graphics system 28 may read in geometry data arrays over the host bus 24 using DMA access cycles. In yet another embodiment, the graphics system 28 may be coupled to the system memory 26 through a direct port, such as the Advanced Graphics Port (AGP) promulgated by Intel Corporation.

The graphics system may receive graphics data from any of various sources, including the host CPU 22 and/or the system memory 26, other memory, or from an external source such as a network, e.g., the Internet, or from a broadcast medium, e.g., television, or from other sources.

One embodiment of a graphics system may comprise a graphics processor coupled to a display buffer. As used herein, a display buffer is a buffer that stores information (e.g., pixels or samples that may be used to form pixels) that represents a particular frame to be output and displayed on a display device. For example, a traditional frame buffer may be considered to be a display buffer. The contents of the display buffer are typically output to digital to analog converters (DACs) that convert the digital information into analog video signals for display on a display device. Depending upon the configuration, the graphics processor (or processors, in the case of a parallel processing system) is configured to execute instructions and/or process data received from main system memory and/or the host CPU.

Computer system 10 may also include a network interface (not shown) to allow the computer system to send and receive data from a computer network. In one embodiment, the computer system may be configured to distribute tasks associated with the management and rendering of a three-dimensional scene graph to other computers on the network. The tasks may be distributed by sending objects (e.g., data and threads) to other computers on the network (i.e., each utilizing its own non-shared memory). The computers may communicate with each other via a system of messages (as explained in greater detail below).

Figure 3:
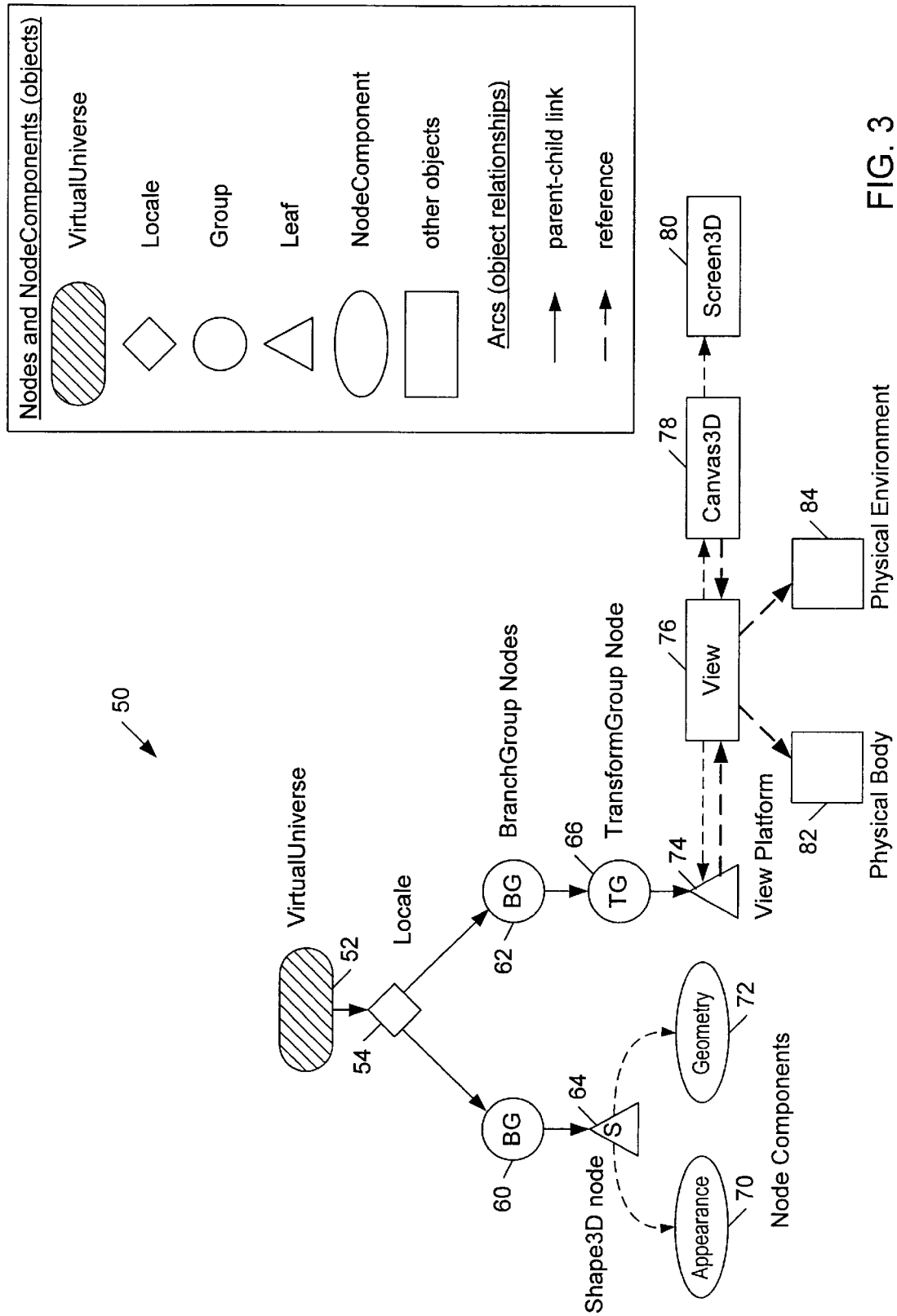
FIG. 3 is a diagram illustrating one embodiment of a scene graph.

Scene Graph—FIG. 3

As noted above, scene graphs are hierarchies of objects and graphics data that define a particular three-dimensional scene or world. For example, the top node may represent an entire building and all the furnishings and people that occupy the building. As the scene graph is traversed, the next level of group nodes may represent particular rooms within the building. Traversing the scene graph one more level may yield group nodes that each represent one person or furniture object (e.g., a chair) in a particular room. Each group node may also have transform node that translates and/or rotates any nodes below the transform node (i.e., child nodes). While many levels of the scene graph are possible, eventually a traversal of the scene graph will terminate at a leaf node. Leaf nodes typically represents a certain object (e.g., a tea cup or a chair) or a portion of a larger object (e.g., a person's hand). The leaf node typically has one or more pointers to graphics data the described the object. For example, in embodiment the leaf node may have pointers to a data file that includes polygons (or NURBS—Non-Uniform Rational B-Splines) defining the shape of the object and texture maps that define the appearance of the object. The leaf node may also have pointers to a bounding box.

Before the scene graph is submitted for rendering, it is advantageous to perform "object culling". Object culling refers to the process of selectively removing objects from the scene graph. In most implementations of object culling, objects are removed either because they are outside the current view frustum, or because they are occluded (either partially or fully). Another example of object culling is discarding objects that are too small to be noticeable (e.g., smaller than some threshold value). Object culling is particularly useful for complex scene graphs that have large number of objects. Since current graphics hardware may be unable to achieve satisfactory frame rates when rendering all of the objects, object culling attempts to remove the objects that cannot be seen from the current viewpoint/orientation. Thus object culling attempts to reduce wasting graphics pipeline bandwidth by rendering only those objects that are actually visible to the viewer. For example, assuming that a particular scene graph represents a virtual model of an entire city, if the current viewpoint is close to the base of a particular building, that particular building will obscure those behind it. Thus, assuming that the building is opaque and that no shadows or reflections of other structures behind the particular building are visible, then there is no reason to devote rendering resources to rendering those obscured structures.

Turning now to FIG. 3, one embodiment of a scene graph 50 is shown. In this example, scene graph 50 is created from instances of Java 3D classes, but other types of scene graphs are also possible and contemplated (e.g., VRML scene graphs). Scene graph 50 is assembled from objects that define the geometry, sound, lights, location, orientation, and appearance of visual and audio objects.

As illustrated in the figure, scene graph 50 may be thought of as a data structure having nodes and arcs. A node represents a data element, and an arc represents the relationship between data elements. In the figure, all nodes of scene graph 50 are the instances of Java 3D classes. The arcs represent two types of relationships between the Java 3D class instances. The first type of relationship is a parent-child relationship. For example, in this embodiment a group node such as branch group node 60 can have any number of children (such as Shape3D leaf node 64), but only one parent (i.e., locale node 54). Similarly, a leaf node has one parent but no children. These relationships are indicated in the figure by solid lines. The second type of relationship is a reference. A reference associates a particular node component object with a scene graph node. Node component objects define the geometry and appearance attributes used to render the visual objects. References are indicated in the figure by dashed lines.

As shown in the figure, Java 3D™ scene graph 50 is constructed of node objects in parent-child relationships forming a tree structure. In a tree structure, one node (e.g., VirtualUniverse node 52 in the figure) is the root. Other nodes are accessible by following arcs from the root. Scene graph 50 is formed from the trees rooted at locale object 54. The node components and reference arcs are not part of the scene graph tree. Since only one path exists from the root of a tree to each of the leaves, there is only one path from the root of a scene graph to each leaf node. The path from the root of scene graph 50 to a specific leaf node is called the leaf node's "scene graph path." Since a scene graph path leads to exactly one leaf, there is one scene graph path for each leaf in the scene graph 50.

Each scene graph path in a Java 3D scene graph completely specifies the state information of its leaf. State information includes the location, orientation, and size of a visual object. Consequently, the visual attributes of each visual object depend only on its scene graph path. The Java 3D renderer takes advantage of this fact and renders the leaves in the order it determines to be most efficient. The Java 3D programmer normally does not have control over the rendering order of objects.

Graphic representations of a scene graph can serve as design tool and/or documentation for Java 3D programs. Scene graphs are drawn using standard graphic symbols as shown in the figure. Java 3D programs may have many more objects than those of the scene graph.

To design a Java 3D virtual universe, a scene graph is drawn using the standard set of symbols. After the design is complete, that scene graph drawing may be used as the specification for the program. After the program is complete, the same scene graph is a concise representation of the program (assuming the specification was followed). Thus, a scene graph drawn from an existing program documents the scene graph the program creates.

Rapid Processing of Scene Graph-Based Programs

First, a general overview of one embodiment of a system and method for scene graph-based programs is disclosed. Then, a more detailed explanation of one embodiment of the system and method implemented within the context of a Java 3D API is disclosed. As one skilled in the art will appreciate after reviewing this disclosure, the accompanying figures, and the attached claims, other programming languages and/or APIs may be utilized or modified to implement the system and method disclosed herein.

As noted above, To improve the flexibility and/or speed of processing scene-based programs, a graphics system (hardware and/or software) may be configured to use a scene graph directly or as a "source" structure for building various ancillary structures. A detailed description and example of the use of a scene graph is attached hereto in Attachment 2 ("Getting Started with the Java 3D™ API"). In one embodiment the graphics system may be configured to use those ancillary structures to either (i) aid in rendering and executing a scene-graph-based program, e.g., one that includes rendering (including frustum culling and occlusion culling), sound (including mono, stereo, and spatialized sounds), execution culling, collision detection, and/or picking, more efficiently; or (ii) aid in generating ancillary structures for direct execution with limited or no reference to the original scene graph (compilation).

This may include, but need not be limited to, the use of ancillary structures to reduce the extent of traversal of the original structure, replacement of the original structure by one or more ancillary structures thereby reducing references to the original structure (scene graph), or even the complete replacement of the original structure by new structures containing sufficient information to render and execute the associated scene-graph-based program (including, but not limited to, graphics, behavior, sound, collision detection, and picking).

One particular implementation of such an ancillary structure (designed for scalability) is a lower dimensional version of k-dop hierarchy, in this case a hierarchy of axis-aligned bounding-boxes (6-dops) for use in visibility detection, frustum culling, occlusion culling, execution culling, collision detection, bounding volume determination, and picking. One such embodiment is disclosed in U.S. patent application Ser. No. 09/247,466, filed on Feb. 9, 1999, entitled "Visible Object Determination for Interactive Visualization."

In some embodiments, the system may support a system-based scheduler, called master control, that handles management of various resources including the resources of single and multi-processor systems. Master control may manage the various renderers and system computations and allocates their execution to a computer's various processors, memory systems, and even other network-attached computers. Master control can serialize the system's various computations or to execute those computations in parallel. It can allow adding or removing rendering and computational components both at initial startup time or dynamically over time as the system continues to execute. This orthogonalization of the various rendering and computational components allows extending the scene-graph-execution system with new renderers (such as haptic renders for touch or force feedback devices) or replacing an existing renderer with a different implementation of that renderer.

In some embodiments, the system may also implement the use of message passing for specifying state changes. These messages are labeled with a monotonic increasing time-/event-stamp. These "stamped" or labeled events allow concurrent or distributed processing while ensuring consistency.

In some embodiments, the system may be configured to use "epochs" to ensure consistency. An epoch consists of all messages having compact (continuous) set of labels (time-/event-stamps) that fall within an selected interval of "stamped" messages. The continuous declaration of a new epoch allows renderers and other computations to work within the current epoch and thus work with a consistent set of changes.

In some embodiments, an ancillary structure called the geometry structure may be used. The geometry structure may be configured to contain the current consistent state of all spatially-located renderable objects. The structure may be a bounding-box hierarchy that uses a cluster algorithm for grouping renderable, spatially-located, objects. It may also include specialized method for rapidly including and excluding larger number of objects (switch processing). It may further include specialized methods for re-balancing the hierarchy to retain desirable properties. It permits consistent and concurrent access to its objects.

An ancillary structure called the rendering-environment structure that contains the current consistent state of all non-renderable spatially located objects (including non-geometric objects such as lights, fog, background, clip, model-clip, etc. nodes). It shares the specialized method for rapidly including and excluding objects and for re-balancing the hierarchy to retain desirable properties. It permits consistent and concurrent access to its objects.

In some embodiments, the graphics system may be configured to generate/support an ancillary structure called a render-bin. A render bin may be configured to contain a superset of the objects that need to be rendered for a particular frame. The render bin may "age" objects held within the structure and remove "over-age" objects during occasional "compaction" computations. The render-bin structure may be MT/MP (multithread/multiprocessor) enabled, thereby allowing concurrent access both for adding objects and for access to objects. The structure may both sort objects to be rendered into an order more compatible with the underlying rendering hardware architecture and for other local (almost "peephole") optimization that allow renderable components to combine or split for more appropriate matching to the underlying hardware. The renderable objects, held within the render bin, can have associated callbacks that will execute before the associated object is rendered, and they can hold references to multiple state change objects. They can also contain system specific computations including multiple transform matrices, rendering attributes, and levels of geometric detail, or user-specified computation versions of each of the previous. The render-bin structure may be optimized to include or exclude large groups of renderable objects (switch mode processing).

Figure 4:
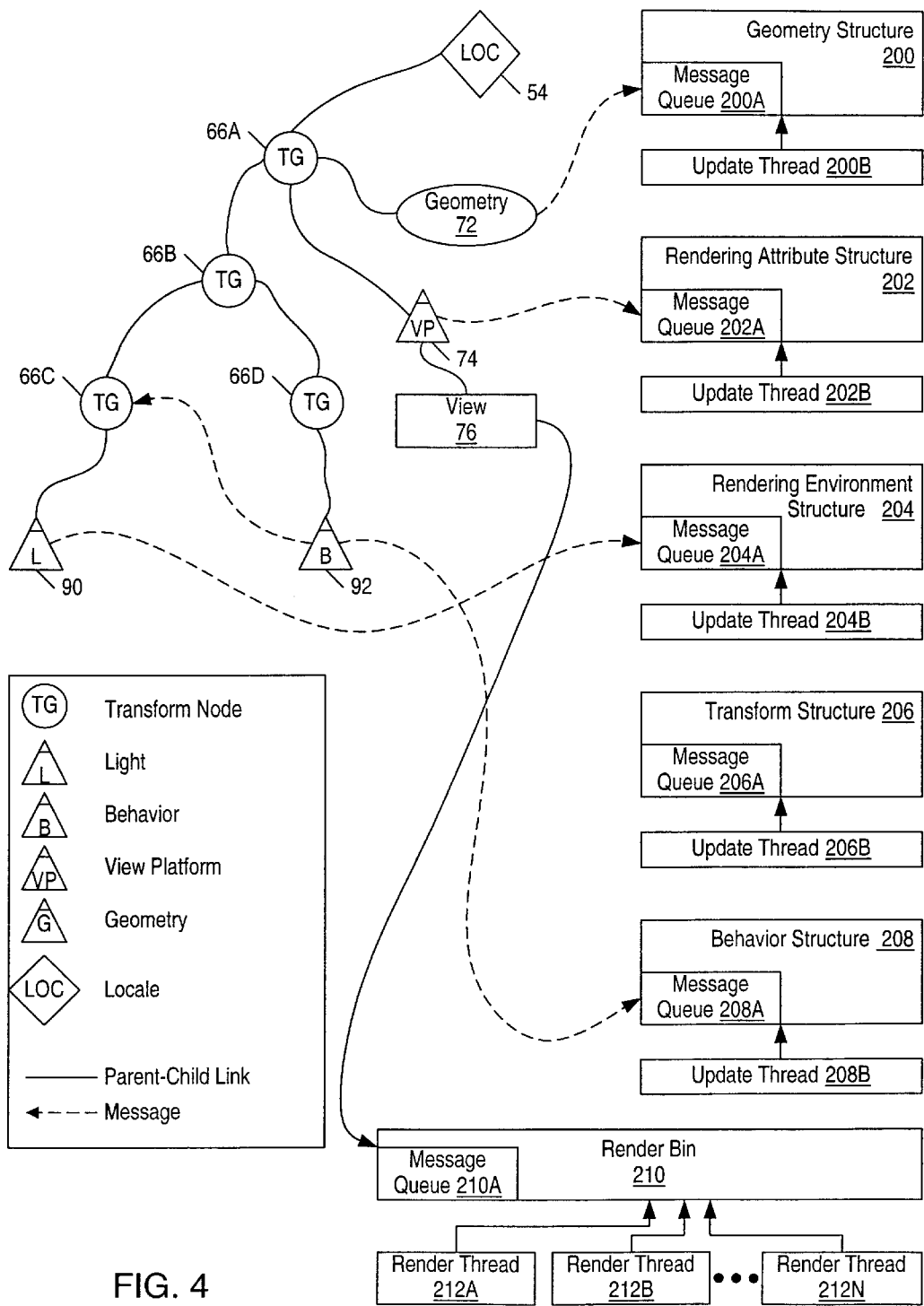
FIG. 4 is a diagram illustrating one embodiment of a scene graph with parallel structures for managing and rendering.

Turning now to FIG. 4, a diagram illustrating one embodiment of a method for creating a parallel structure for managing and rendering scene graphs is shown. The scene graph comprises locale node 54, transform nodes 66A–D, view platform 74, light node 90, behavior node 92, Shape3D node 64, appearance node component 70 and geometry node component 72. Note that the figure only illustrates a portion of the scene graph and that additional nodes and node components (e.g., BranchGroup nodes) are present but not shown in the figure for simplicity.

As shown in the figure, as the scene graph is created or initially traversed, a parallel configuration comprising a number of structures 200–210 is generated. each structure is responsible for a particular type of object in the scene graph. For example. geometry structure 200 is responsible for the geometry node components of the scene graph. Similarly, rendering attribute structure 202 is responsible for rendering attributes such as the appearance node component 70. Rendering environment structure 204 is responsible for lighting and other environmental effects such as fog. Transform structure 206 is responsible for transformation group nodes, and behavior structure 208 is responsible for behavior nodes (e.g., changes to objects as the result of certain conditions being met, such as a collision being detected). Render bin 210 is responsible for the selecting and rendering objects.

As shown in the figure, the parallel data structures 200–210 may each have an update thread 200B–210B. The update threads may be invoked (e.g., based on messages in the corresponding message queue) to process changes. For example, assuming the color of the light node 90 changes, a message to that effect may be sent to rendering environment structure 204's message queue 204A. The rendering environment structure's update thread 204B may be invoked to check the message queue 204A for messages, detect the update message, and change the rendering environment structure 204 accordingly. In some cases, the update thread may generate its own messages that are conveyed to other structures (e.g., to render bin 210).

Render bin 210 may be configured with a number of different render threads 212A–212N in addition to update thread 210B. These threads may operate in parallel and render different portions of the render bin 210. One example of this is a system utilizing a head-mounted display for virtual reality. Head mounted displays typically have two screens (one for each eye). To achieve a visible stereo effect, each display typically displays a different image, each rendered according to a different viewpoint. Thus, a different render thread may be started for each of the two different displays. Similarly, in some virtual reality applications, multiple users may each have their own viewpoint as they individually navigate the virtual world. In another embodiment, a different render bin is generated for each viewpoint (this described in greater detail below). The render threads may still operate in parallel, but may each correspond to a particular object or objects instead of a particular view.

Note, while a number of different types of parallel data structures are shown in the figure and described herein, additional types of parallel data structures may be created as necessary (e.g., for sound or force feedback device support), depending upon the exact implementation. Similarly, a number of additional threads may also be created.

Advantageously, by using this parallel structure the scene graph need be traversed only once to generate the parallel structures. By reducing the number of scene graph traversals, rendering performance may potentially be improved. Furthermore, different portions of the parallel structures and their corresponding threads may be conveyed across a network to another computer for parallel processing (i.e., to one or more non-shared memory computers). Once each structure is set up, execution may occur in parallel, with state change information being conveyed via messages transmitted between the different computers or processors. In contrast, continually repeating traversals of the scene graph does not lend itself as well to a parallel processing implementation, particular when the parallel processors do not share memory.

Each structure 200–210 has a corresponding message queue 200A–210A that is configured to receive and store messages. As shown in the figure, during the creation or initial traversal of the scene graph, messages may be generated and conveyed to the corresponding parallel structures. For example, when geometry node component 72 is added to the scene graph, a message is sent to geometry structure 200's message queue 200A. Similarly, when light node 90 is added to the scene graph, a message is sent to rendering environment structure 204's message queue 204B.

Figure 5:
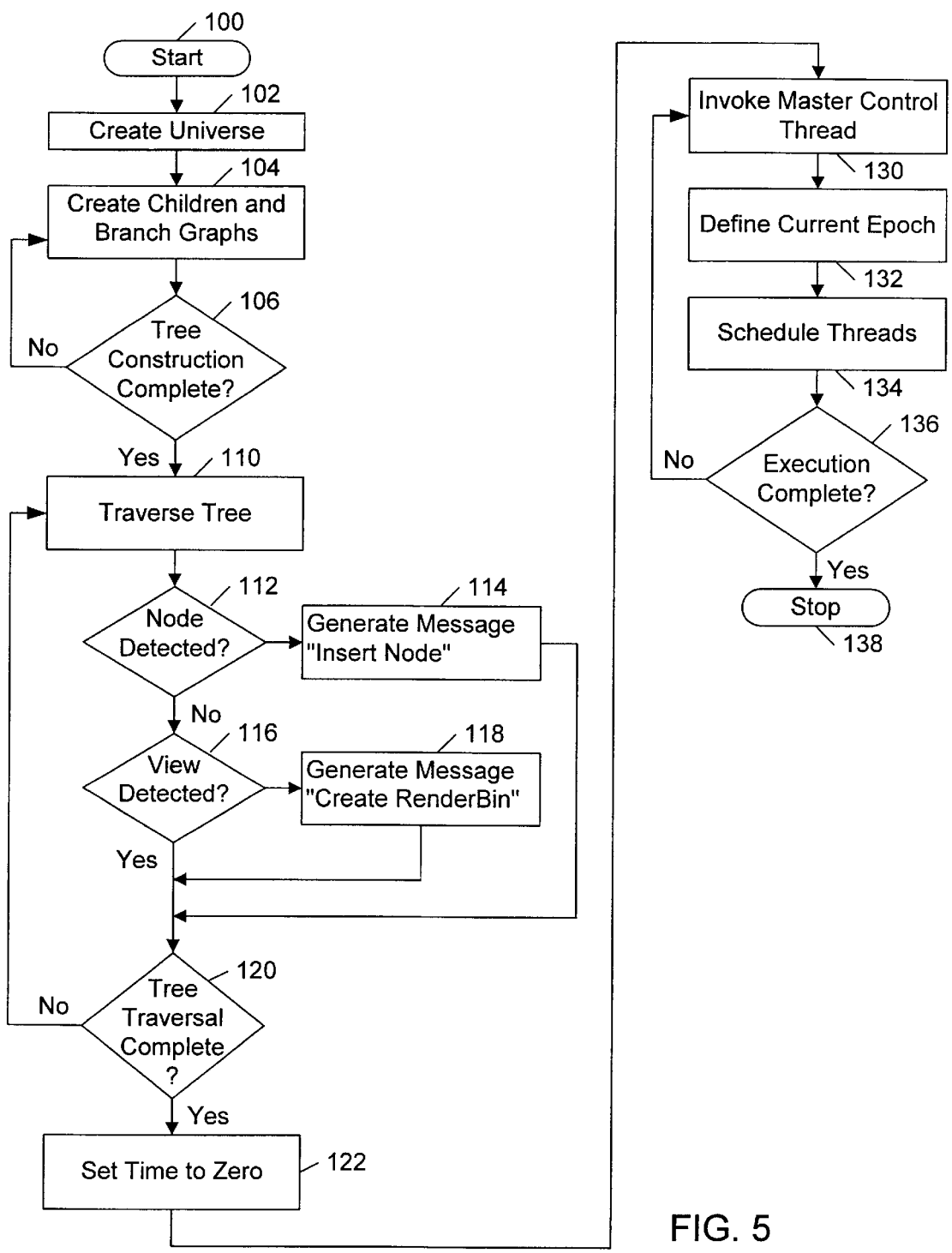
FIG. 5 is a flowchart of one embodiment of a method for generating the parallel structure of FIG. 4.

Turning now to FIG. 5, a flowchart of one embodiment of a method for creating parallel structures for managing and rendering scene graph-based graphics data is shown. In this embodiment, the method begins (step 100) with the creation of a universe (step 102). Next, children nodes (e.g. as shown in FIGS. 3 and 4) and branch graphs are created (step 104). This process continues until the tree is complete (step 106). Next, the tree is traversed (step 110). For each node detected (step 112), a message (e.g., "InsertNode") is generated (step 114). Similarly, for each new view detected (step 116), created a message (e.g., "CreateRenderBin") is generated (step 118). This process continues until the tree has been completely traversed (step 120). Note, in other embodiments the messages may be generated concurrently with the creation of the scene graph tree.

Next, a time counter may be initialized (step 122), and the master control thread may be started (step 130). The master control thread is configured to define the current epoch (step 132), and then schedule threads for execution (step 134). This process continues until execution is complete (steps 136–138). An epoch is a time period defined by the master control thread to allow for efficient scheduling of thread execution. Messages may be timestamped, thereby allowing the master control thread to schedule threads based on the age (and importance) of the messages or tasks to be processed by the threads. One embodiment of this time management process is described in greater detail below.

Example Embodiment Using Java 3D™ API

Java 3D Architecture

The Java 3D API may be used to implement one embodiment of the system and method described above. One such implementation is described in detail below. However, it is noted that other implementations are also possible and contemplated. To describe this particular embodiment, an overview of the Scene Graph Structure will be presented, and then components of a runtime system will be presented. Next, the process of system startup, runtime system operation, and system shutdown are presented. Then, specific features of this embodiment are explained in greater detail. Also note, that standard Java™ and Java 3D variable names, object names, and processes are used herein. For more information on Java and Java 3D, the reader is directed to the books titled "The Java 3D™ API Specification," by Sowizral, Rushforth, and Deering, published by Addison-Wesley Publishing Co., ISBN: 0201710412, and "The Java™ Programming Language" by Ken Arnold, James Gosling, David Holmes, published by Addison-Wesley Publishing Co., ISBN: 0201704331.

Scene Graph Structure

The Java 3D API is a set of Java classes. Applications create instances of these classes and invoke their methods to control Java 3D. In one implementation, many of these classes may be merely wrapper classes around retained classes that actually handle the implementation. When an API object is created, that object may create its retained counterpart. This is true for all classes that are subclasses of Node and NodeComponent. In one embodiment, the working scene graph structure is implemented on the retained side alone.

Figure 6:
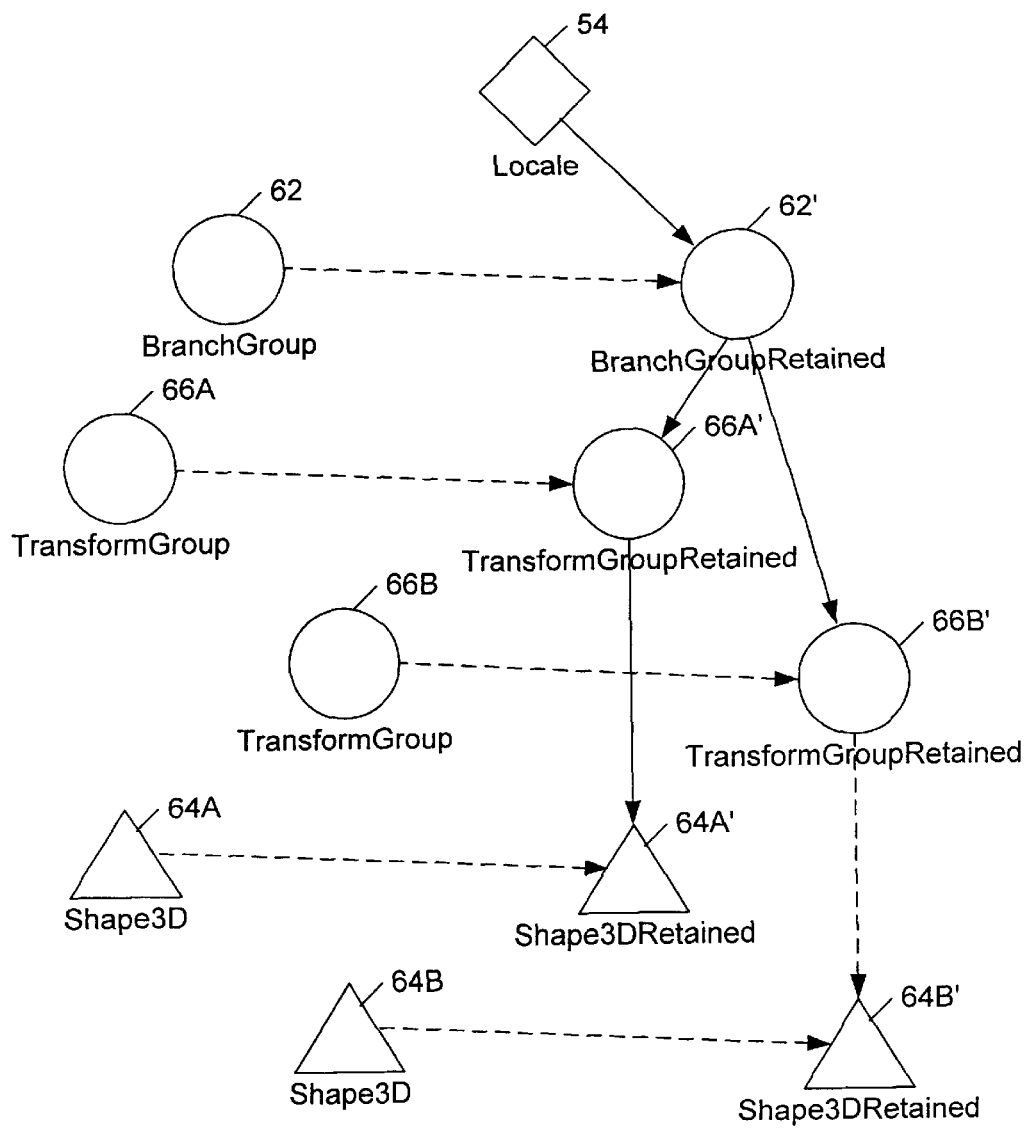
FIG. 6 is a diagram of another embodiment of a scene graph.

Turning now to FIG. 6, one embodiment of the scene graph structure is shown. In this embodiment, the scene graph structure and all the child/parent relationships are implemented in the retained classes. The API classes may be configured as wrapper classes (62, 66A, 66B, 64A, 64B) around the retained classes (62', 66A', 66B', 64A', and 64B'). In addition, all scene graph links (e.g., parent/child relationships) are implemented on the retained side. In some embodiments most of each class may be implemented on the retained side. As also shown in the figure, in this embodiment the "Locale" class has no parallel retained class. One possible advantage of using this type of internal structure is that capability bit processing and scene graph compilation are simplified (as described in greater detail below).

Capability Bit Processing

Capability bits may be used in the Java 3D API by applications to inform Java 3D what modifications or queries the application will make to different parts of the scene graph. Each Node and NodeComponent in the scene graph may have capability bits defined for that Node or NodeComponent. After a branch graph has been made live (inserted into the scene graph) or compiled (via BranchGroup.compile( ) or SharedGroup.compile( )), the application may only modify or make queries based on the capability bits that it has set for each object. This may be implemented by having the methods in each of the API classes responsible for checking capability bits before calling the parallel retained method.

The following code is an example of such a test from the Material class:

```
public final void setAmbientColor(Color3f color) {
if (isLiveOrCompiled())
if (!this.capabilities.get(ALLOW_COMPONENT_WRITE))
throw new CapabilityNotSetException("Material: no capability
to set component");
((MaterialRetained)this.retained).setAmbientColor(color);
}
```

The Material.ALLOW_COMPONENT_WRITE capability bit is the one defined to control the setting of the material attribute. Some methods have been defined to not be modifiable once the Object has become compiled or live. The following code is an example from ImageComponent2D:

```
public final void set(BufferedImage image) {
checkForLiveOrCompiled();
((ImageComponent2DRetained)this.retained).set(image);
}
```

In this case, the checkForLiveOrCompiled( ) will throw an exception if the component is live or compiled. In some embodiments, all Nodes and NodeComponents may enforce capability bit processing. Therefore, all Nodes and NodeComponents have parallel retained classes. As changes are made to the API, Nodes and NodeComponents may be given new features that may require new capability bits. To facilitate this while at the same time trying to maintain a compact overall set (i.e., so that the capability bit test can be performed quickly), there is a class may be included that defines all the capability bit values. This class may assign the bit values in linear order based on the class hierarchy. Advantageously, any path in the class hierarchy may have bit values progressing in linear order. In addition, independent hierarchies can have the same bit values, thereby providing a compact set of bit values.

In Java 3D, the deepest class hierarchy is the ConeSound hierarchy, with a maximum capability bit value of 39. Some implementations may set a limit or goal of less than 64 bits (i.e., the number of bits available in a "long" variable type).

Compiling Branch Graphs

The Java 3D API allows applications to compile a BranchGraph or SharedGraph (via BranchGroup.compile( ) and SharedGroup.compile( )). At compile time, the implementation may analyze the subgraph and perform optimizations on the subgraph. The implementation may use the capability bits that the application has set to guide the optimizations. An example of one possible optimization is to flatten the scene graph.

Figure 7:
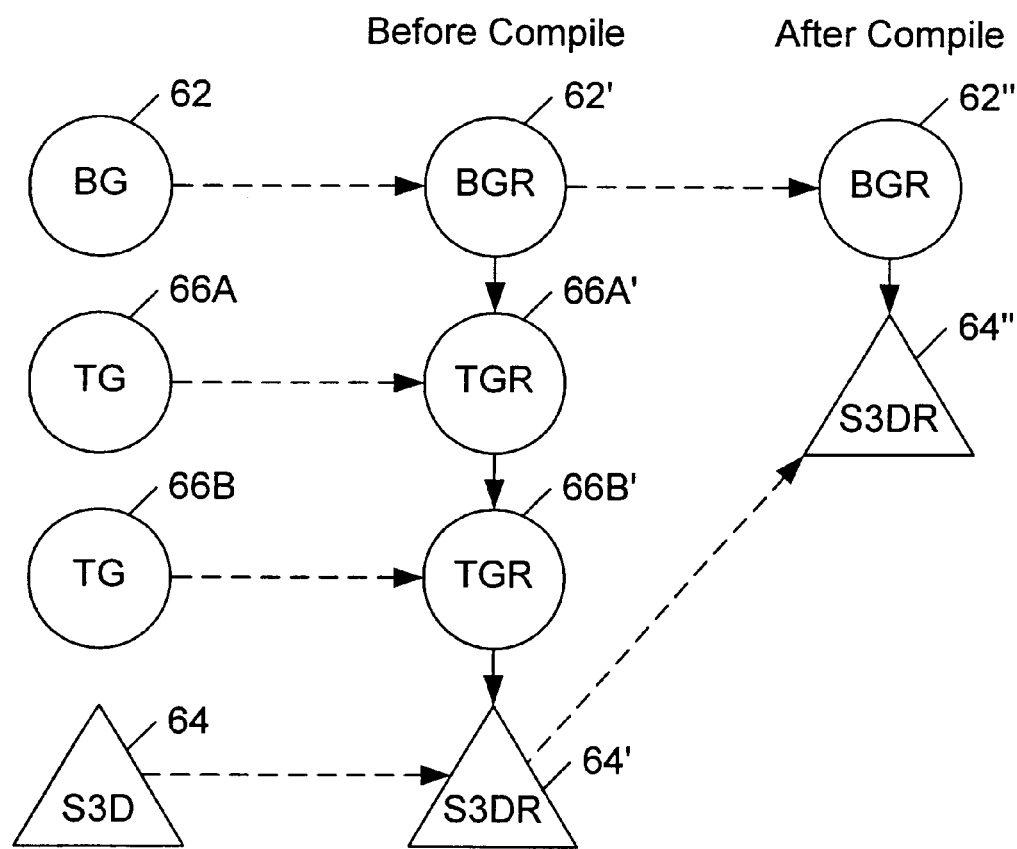
FIG. 7 is a diagram of one embodiment of structure optimization.

Turning now to FIG. 7, one embodiment of a method for flattening a scene graph is illustrated. The figure illustrates two features. First, in this example the TransformGroup Nodes 66A–B have no capability bits set, so they may not be modified or queried. As a result, when the branch graph was compiled, the TransformGroupRetained Nodes were eliminated with their composite value cached in the Shape3DRetained node 64".

Second, one possible advantage of configuring the API classes as wrapper classes around the retained classes is shown. Since the TransformGroup nodes have no capability bits set and this branch has been compiled, there is no way for the application to modify or query the TransformGroupRetained nodes. Thus, they can be eliminated. The application still may have references to the TransformGroup nodes, but since no capability bits are set, they do not matter.

Thus, the figure illustrates one example of compilation optimization. In general, however, compilation optimizations are independent from optimizations in the rest of the Java 3D implementation. In some embodiments, the optimizations may be performed before the Java 3D runtime system ever receives or processes the subgraph. Other compile optimizations may include clustering small Shape3D nodes, splitting large Shape3D nodes, stripifying geometry data, and even compressing geometry data.

Runtime System Overview

The Java 3D API is configured to support a multithreaded fully asynchronous implementation. The API also allows an implementation to use either the Scene Graph as its working structure, or alternate data structures to improve performance. In some embodiments, the Scene Graph is the main working structure. For many features, this is a useful working structure. However, when possible optimizations are considered, the scene graph may actually be a limiting structure to work with. Thus, in other embodiments a more flexible architecture may be supported to provide for greater optimizations. In one embodiment, the more flexible architecture includes three components: structures, threads, and messages. Each of these components is described in greater detail below.

Structures

A structure is an object that manages a collection of other objects. Structures are only lo dependent on the contents of the Scene Graph. They are responsible for optimizing the objects that they contain, given the set of requirements on that structure. They are independent of the scene graph structure and are only responsible for their own objects. The parent class of all structures is J3dStructure. Listed below are descriptions for the different types of structures that may be supported in one embodiment of the system.

GeometryStructure

The GeometryStructure is responsible for organizing all geometry and bounds data in the scene graph. There is one GeometryStructure per VirtualUniverse.

BehaviorStructure

The BehaviorStructure is responsible for organizing all Behavior nodes. It is not responsible for implementing behavior scheduler semantics. It only organizes the nodes and their wakeup criteria for fast execution culling and processing. There is one BehaviorStructure per VirtualUniverse.

SoundStructure

The SoundStructure is responsible for organizing all Sound nodes. It is not responsible for implementing sound scheduler semantics. It only organizes the nodes for fast sound render culling. There is one SoundStructure per VirtualUniverse.

RenderingEnvironmentStructure

The RenderingEnvironmentStructure is responsible for organizing objects that effect the rendering environment. This includes Light, Fog, Clip, Background, and ModelClip nodes. It does not implement their semantics. It only provides fast methods for determining the environment characteristics that apply to a scene or particular geometry. There is one RenderingEnvironmentStructure per VirtualUniverse..1.3.1.5

RenderingAttributesStructure

The RenderingAttributesStructure is responsible for managing all rendering NodeComponent objects and their mirror objects. There is one RenderingAttributesStructure for all of Java 3D.

RenderBin

The RenderBin structure is responsible for organizing the collection of visible geometry objects optimally for rendering. There is one RenderBin per View.

TransformStructure

The TransformStructure is responsible for updating all transforms and bounds used within the system.

Threads

Threads are configured to use the structures described above. There are many different types of threads in the 1.2 implementation. This section presents all the thread types in the system.

MasterControl

MasterControl is the controlling thread for the system. It does scheduling for all other threads in the system. It is also responsible for taking time snapshots. This will be covered in the Time section. There is one MasterControl for the entire system.

J3dThread

J3dThread is the abstract parent class for all other threads in the system. It implements all the functionality for initializing, being notified by MasterControl, and cleanup for the threads. All threads in the system, aside from MasterControl, are a subclass of J3dThread.

StructureUpdateThread

Every structure has a StructureUpdateThread. When messages are sent to a structure, the StructureUpdateThread is scheduled to retrieve those messages for its structure. It only retrieves messages for the structure that fall between the time interval for that update pass. This is described in greater detail below.

Renderer

This is the thread that renders the geometry. It also issues the SwapBuffers command. There is one Renderer per Screen3D. When there are multiple Canvas3Ds on a single screen, the Renderer thread is run for each Canvas3D. The Renderer uses the RenderBin and the RenderingAttributesStructure.

BehaviorScheduler

This thread is responsible for scheduling and processing active behaviors that have triggered. It uses the BehaviorStructure. There is currently one BehaviorScheduler per VirtualUniverse.

SoundScheduler

This thread is responsible for sound scheduling and sending sound rendering requests to the AudioDevice3D. There is one SoundScheduler per View. It uses the Sound-Structure.

InputDeviceScheduler

This thread is responsible for scheduling non-blocking input devices. There is one InputDeviceScheduler per PhysicalEnvironment.

Messages

Messages are used to communicate any change that happens in the system, internal or external, through the system. In one embodiment, a single message class is implemented called "J3dMessage". Each message may have the following fields:

| | |
|---|---|
| time - | The time when the message was sent. This is filled in by MasterControl, who is the keeper of time. |
| refcount - | The reference count of this message. A message could go to multiple destinations. When all destinations consume the message, its refcount goes to 0, and the message gets put on the freelist. |
| threads - | A bitmask representing all thread types that need this message. |
| universe - | The universe where this message originated. |
| view - | The View that should receive this message. If it is null, all Views get the message. |
| type - | The type of this message. |
| args - | An array of 5 object references. Arguments are passed to the destinations through this field. |

MasterControl keeps a freelist of messages, so when a message is needed, GC activity is reduced.

Time

As used herein, references to time do not refer to the time measured in System.currentTimeMillis( ). Instead, it is more accurately called the change count. MasterControl has a field called "time" that starts out as 0, and is incremented (i) each time a message is sent into the system, and (ii) when MasterControl takes a time snapshot. This concept of time is used to ensure that the various threads are performing their tasks on data snapshots that are consistent across all threads. This is described in greater detail below (see section heading MasterControl).

System Startup

Bootstrapping Java 3D includes performing some system-related operations in order to prepare the system for processing. In one embodiment, this process only occurs once per invocation of the Java 3D system. The bootstrapping code is contained in MasterControl. MasterControl is a static member of the VirtualUniverse class, which means that only one MasterControl will exist in the Java 3D system. Therefore, the constructor for MasterControl is used to execute bootstrapping code. For example, the type of native graphics library to be used may be queried, and then loaded.

The class that contains the native rendering API to use is called NativeAPIInfo. A different implementation of this class may be compiled for each different target platform. This class has one method, getRenderingAPI( ), and its possible values are RENDER_OPENGL_SOLARIS, RENDER_OPENGL_WIN32, or RENDER_DIRECT3D. Note, however, that the selection of which rendering library to use may be compiled into the system or it may be made runtime selectable by expanding the bootstrapping process.

Applications may be configured to create Java 3D objects in any order. However, there may also be conditions that cause Java 3D to bootstrap itself. First, as seen above, if a VirtualUniverse is created, bootstrapping will occur. There are other cases, like Canvas3D, where native library access is needed before a VirtualUniverse is created. In these cases, a static initializer method may be included in the class. That method may be configured to call the static method VirtualUniverse.loadLibraries( ), which will cause the static MasterControl to get created, and bootstrapping will occur.

Universe Structures

A number of the structures are created when a VirtualUniverse is created. These include the GeometryStructure, BehaviorStructure, SoundStructure, and RenderingEnvironmentStructure. They are created here because they are View/Rendering independent. They need to be available when Nodes are added to the scene graph, even though a view may not be active yet. The RenderingAttributesStructure is created when MasterControl is created because there is only one for all of Java 3D.

Canvas3D Creation

To create a Canvas3D, applications must first get a GraphicsConfiguration that meets their needs. This involves filling out a GraphicsConfigTemplate3D object and passing that object to the getBestConfiguration( ) method on the device to be rendered. In the current implementation only the default screen device is supported. GraphicsDevice.getBestConfiguration( ) simple calls the GraphicsConfigTemplate3D.getBestConfiguration( ) method passing all available configurations as its argument. It is then the responsibility of the GraphicsConfigTemplate3D class to select the best GraphicsConfiguration for that template and return it. GraphicsConfigTemplate3D is a Java 3D class, so it has control over the selection process. In GraphicsConfigTemplate3D, there is a class, NativeConfigTemplate3D, that is built into Java 3D at compile time which implements the platform/rendering API specific selection semantics. For Solaris, where OpenGL is the only rendering API, the list of GraphicsConfigurations passed in is ignored, and the selection is performed in native code by doing a glXChooseVisual( ). Once the visual is selected, its id is passed back and matched with the GraphicsConfigurations passed in. The GraphicsConfiguration that matches is returned. On win32, for both OpenGL and Direct3D, the selection process does nothing. The PixelFormat for a win32 window may be changed at any time, so Java 3D simply changes the PixelFormat of the window when the first rendering GraphicsContext is needed by the system. This will be covered more when the Renderer is covered.

At the end of this, the Canvas3D is capable of being rendered into with the current rendering API. However, the system does not start up until the Canvas3D is ready to be rendered into, or activated. This process is described below.

View Activation

The runtime system is started in two steps. The first one is triggered by a Canvas3D object being added to an AWT (abstract window toolkit) container (i.e., when Canvas3D.addNotify( ) is called). In response, the canvas notifies its View that it has been added by calling View.addNotify( ). At this point, the View registers itself and the provoking canvas with MasterControl. Next, the Views RenderBin and SoundScheduler are created and initialized. If this is the first view to be registered with MasterControl, then the BehaviorScheduler is also created and initialized. If this is the first canvas registered for its screen, the Renderer for that screen is also created and initialized.

At this point, all threads and structures have been created and initialized. The View, however, is still not active (i.e., its structures will not receive messages and its threads will not be scheduled by MasterControl). These will not occur until a Canvas3D associated with the view is activated. In one embodiment, three conditions must be satisfied before a Canvas3D may be activated. First, a paint event must have been received on the Canvas3D. This is a requirement based on how AWT allocates underlying window system resources for Canvas3Ds (this is described in greater detail below in the Renderer section). Second, the Canvas3D must be in a running state. This is controlled directly by the Canvas3D.start/stopRenderer( ) methods. The third and final condition is that the Canvas3D must be visible on the screen. This is monitored by tracking various events on the Canvas3D. To track events on the Canvas3D, an internal class (EventCatcher) implements all the appropriate listener interfaces for events that the Canvas3D or BehaviorScheduler are to track. The EventCatcher receives the events and then passes them onto the BehaviorScheduler. The EventCatcher also notifies the Canvas3D that its state has changed. If the state of any of the three conditions change, Canvas3D.evaluateActive( ) is called to re-evaluate the Canvas3D's state. If the Canvas3D's active state changes, it notifies the View that it is associated with to evaluate its state—via View.evaluateActive( ). In one embodiment, there are two conditions that are met before it is activated. First, it must be attached to a live ViewPlatform. And second, one of the Views Canvas3Ds must be active. If the state of the View changes, it activates or deactivates itself.

View activation involves a several steps. First, a message is broadcast to the threads in the system that a new View has been activated. This is done to ensure that the new View is registered with all interested structures. This message also makes the initial visibility and render operations happen on this View. Next, the View gets an id number if it doesn't have one. The use of this id is discussed below. After receiving the id number, the View checks to see if its VirtualUniverse has a primary view. If it doesn't, then it has MasterControl select a new primary view. Then, the View has its VirtualUniverse enable all currently enabled events (as selected by the BehaviorScheduler) on all the Canvas3Ds associated with this View.

Note—ComponentEvents are always enabled for Canvas3Ds to ensure activation tracking is always done. Finally, the View has MasterControl activate it. At this point, MasterControl marks the Views RenderBin and SoundScheduler as active. If this is the only active View, MasterControl also activates the BehaviorScheduler. At this point, the system is in a normal operating state.

System Flow

Since this implementation is based on message passing, there is no set system flow that occurs. However, to explain how the components interoperate, an example application scenario can be used as an example. In this example, the application is HelloUniverse, a single cube spinning. From Java3D's point of view, this application consists of one Shape3D node with a TransformGroup above it that is changing. The TransformGroup is being changed from a Behavior that gets triggered once per frame. To see how this looks internally, one looks to MasterControl first.

Figure 8:
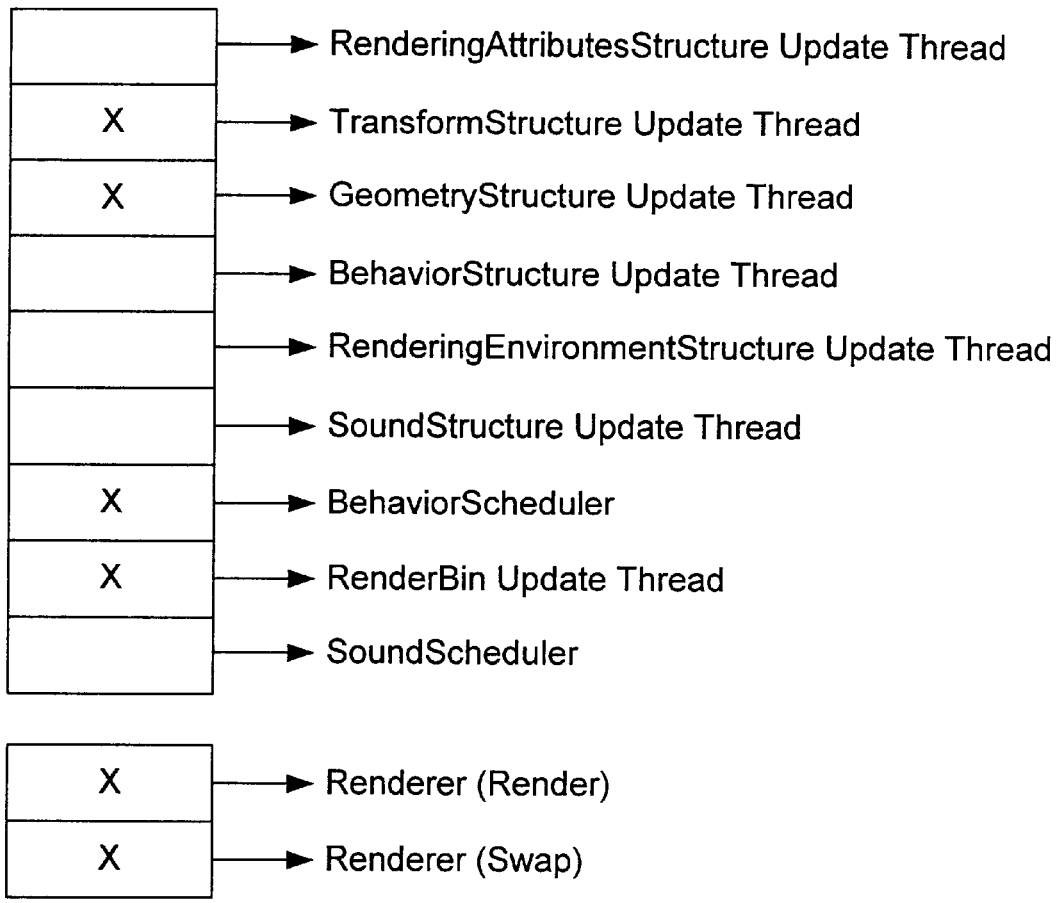
FIG. 8 is a diagram of one embodiment of a list of current work threads.

Turning now to FIG. 8, one embodiment of the threads managed by MasterControl for the HelloUniverse example application is shown. While the number of threads shown in the figure may seem high for such a simple application, only the ones with an "X" in the box will be run on each iteration. Also note that each structure and update thread are conditionally created based on what is in the scene graph. First, to start an interation, MasterControl takes a time snapshot. In other words, at this point in time, MasterControl decides which threads need to be run on this particular iteration. This decision is based on what messages have been sent to each thread. In the example shown in the figure, two update threads are run. Since the TransformGroup is changing every frame, the GeometryStructure and the RenderBin need to track the position of the Shape3D node. Thus, their update threads get scheduled for each iteration. In this case, both update threads update their Transform3D values for the Shape3D node. Since the GeometryStructure and the RenderBin are working on two different reference times, the values they cache are different. This is accomplished with a new object called the CachedTransform. This object is explained in greater detail below in connection with TransformGroup nodes. MasterControl waits for all update threads to finish before proceeding with this iteration. This ensures that the rest of the threads work with valid data without having to track state updates.

The figure actually shows two thread lists. The first one contains update and "work" threads, while the second list has render threads. MasterControl keeps two lists so that it may process them in parallel, giving the render threads a higher priority. The render threads always work off of the RenderBin structure, so there may be some constraints on what the RenderBin may do while processing messages. This is described in greater detail in the RenderBin section below. In the HelloUniverse example, the first Render thread will be scheduled first. It renders the RenderBin. At the same time, each update thread is allowed to run. In this example, that includes the TransformStructure and the GeometryStructure.

Next, the BehaviorScheduler is allowed to run, and finally the RenderBin update is allowed to run. During this time, if the Render thread finishes, the render Swap thread is allowed to run. This completes an iteration of HelloUniverse.

Next, a brief description of what each thread does in this example is provided. Since a TransformGroup is changing each frame, the TransformStructure needs to update the localToVworld values and bounds in virtual world coordinates for geometry objects in the system. All update threads after the TransformStructure cannot be scheduled until after the TransformStructure update completes. This is because most structures rely on its updated values.

The next structure to be updated is the GeometryStructure. This structure maintains a spatial data structure of all geometry data in the scene. If one object moves, then this data structure is updated to reflect the new position of the object.

The BehaviorScheduler and RenderBin update may execute at the same time. The BehaviorScheduler will execute behaviors that have been triggered since the last cycle. In this case, it is the RotationInterpolator that is spinning the cube.

For the RenderBin update, since the cube moved the RenderBin checks if the same lights and fog apply to this geometry. If the same ones apply, then it is done—which is the case here. The RenderBin update thread must not actually modify the RenderBin. This is because the Renderer(s) are executing the RenderBin at the same time as the RenderBin update thread. If a change is needed, it is simply recorded and is deferred until the ObjectUpdate time (described in greater detail below).

In parallel with this, the Renderer threads may also be running. The first Renderer thread invocation is responsible for rendering all visible objects into the Canvas3D. Once it has completed, the second Renderer thread invocation will perform the buffer swap. After the buffer swap has been completed, MasterControl may be configured to notify the BehaviorScheduler that a frame has elapsed. That notification triggers the behavior again, and the process continues.

System Exit

One potential advantage of the Java memory model is that system exit and cleanup is relatively simple. If the application removes all references to its Java 3D objects, and if all Java 3D threads exit, then the Java garbage collector will reclaim all of the Java resources that Java 3D has allocated. Unfortunately, in some implementations there is not support for notifying Java 3D when the application is finished with Java 3D. Thus, an alternative mechanism may be used to ensure that Java 3D threads exit when they are not needed.

In one embodiment, this mechanism may be implemented in the existing addNotify/removeNotify scheme. For example, as Canvas3Ds are removed from their containers, they may be configured to notify their Views. When a View is removed, it notifies MasterControl via MasterControl.unregisterView( ). MasterControl then stops all the threads associated with that View. If that was the last registered View, then MasterControl stops the VirtualUniverse based threads, and finally itself. Since this removes all active Java 3D threads, when the user no longer has any Java 3D references, it will be completely reclaimed by the JVM (Java Virtual Machine). This completes the overview of the Java 3D runtime system. Below, individual components that may be used to implement the system and method described herein, their architecture, and the algorithms they use are described in greater detail.

MasterControl

MasterControl is the global controlling object in Java 3D. It is a static object in the VirtualUniverse class, so there is only one in the system. Its main function is to perform user-based scheduling of all other threads. It may also implement a few of the API features.

Thread Creation and Destruction

In one embodiment, all schedulable threads in the system are subclasses of J3dThread. This class implements all initialization, communication, and destruction code for the threads. This gives MasterControl a common interface for creating, scheduling, and destroying threads.

There are two types of thread associations in the system, i.e., threads associated with a VirtualUniverse and threads associated with a View. Each will be discussed in turn. Regarding VirtualUniverse threads, the Structures for a VirtualUniverse are created when the VirtualUniverse is created. The threads associated with a VirtualUniverse only need to be initialized when there is a registered view in that VirtualUniverse. So, that becomes the triggering event for initializing those threads. When the first view of a VirtualUniverse is registered, MasterControl initializes the threads for the VirtualUniverse. The structures that get created and initialize are the GeometryStructure, BehaviorStructure, SoundStructure, and RenderingEnvironmentStructure. Again, the RenderingAttributesStructure is created by MasterControl as one global structure. Each of these structures has an update thread that gets registered with MasterControl. Along with these structures, MasterControl also creates and initializes the BehaviorScheduler for the VirtualUniverse. Finally, if there is no MasterControlThread, this causes the MasterControlThread to be created and initialized.

For View-based threads, the triggering event is the registration of a View. When a View is registered, the threads for that View are created and initialized. These threads include the SoundScheduler and the update thread for the RenderBin. The InputDeviceScheduler for the PhysicalEnvironment of this View are also created and initialized (if needed). Also, each unique Screen3D associated with each Canvas3D of the View will have its Renderer thread initialized. Although the threads have been created and initialized, they are not active yet. This happens once a View becomes active. When a View becomes active, all the threads associated with it are activated. It is at this point that MasterControl considers them for scheduling. When a View gets deactivated, the threads are simply marked as not active. They are not destroyed at this point. This allows for stopping the threads on a View without having to destroy them.

Thread destruction for View-based threads is triggered by the unregistering of a View. Since MasterControl is completely asynchronous with View registration, some bookkeeping in needed. When a View is unregistered, MasterControl waits until a safe point in time before destroying the threads. Instead of destroying them immediately, it simply puts them on a zombie thread list. Then, when the MasterControlThread looks for changes in the thread list, it will destroy zombie threads by calling J3dThread.finish( ). Since a View could possibly unregister and reregister itself before the MasterControlThread can clean the zombie list, it is desirable to have all thread creation code first check if the thread to be created is on the zombie list. Destruction of VirtualUniverse threads is triggered by removal of the last View for a the VirtualUniverse. This is an asynchronous event as well, so the threads are also put on a zombie list to be purged by MasterControl at a safe time.

MasterControlThread

The MasterControl object is split into two parts to allow for Java 3D to release associated resources when they are no longer needed. All the data is held in the MasterControl object itself, while the controlling thread is encapsulated into the MasterControlThread (MCT). This allows the system to quickly create and destroy the controlling thread while maintaining system state. Using the flow of the MasterControlThread, the bulk of MasterControl can be explained. First, the MCT checks to see if there are any tasks (i.e., work) to be performed. The Boolean variable workToDo is used to signal the MCT that there is pending work. If there are no tasks to perform, then the MasterControlThread enters a wait state until a task arrives. The work-causing action will notify the MCT. This allows Java 3D to refrain from consuming CPU resources when there are no pending tasks to be performed.

WorkThreads List

Next, the MCT checks to see if any new threads have been added to the system. This is done in updateThreadLists( ). When a thread is added or removed from the system, the MCT updates its list of schedulable threads. When a thread change is needed, the Boolean variable threadListsChanged is set. If this is the case, then updateThreadLists( ) recomputes the workThreads array of threads and cleans up any zombie threads. Next, updateWorkThreads( ) makes thread scheduling decisions. As part of this process, updateWorkThreads( ) first calculate how many entries are needed in the workThreads array. In one embodiment, the workThreads array is two-dimensional. As noted above, there is an array of update/work threads and an array of render threads. The number of entries for each is calculated as follows:

For the update/work list, the number of thread entries is:

The number of update threads, plus
The number of VirtualUniverses (one BehaviorScheduler for each), plus
For each View:
  One SoundScheduler; and
  The number of unique PhysicalEnvironment's (InputDeviceScheduler)

This gives the total length of the update/work array.
For the render list, the number of thread entries is:

One render request thread, plus (For Offscreen and Immediate Mode)
For each View:
  i. The number of Canvas3D's (1 Renderer per Canvas3D), plus
  ii. The number of Screen3D's (1 Swap per Screen3D)

The workThreads array is an array of J3dThreadData objects. The J3dThreadData object encapsulates all the information needed to run a thread for a single invocation. The data that J3dThreadData keeps includes:

The thread reference, a J3dThread
A set of four time values (explained in the Time section)
A bitmask of options for this thread invocation
The arguments to be passed to the thread
Whether or not this thread needs to be run on this pass; and
Arguments used by the Renderer thread The J3dThreadData object is used to allow a thread to exist in the list of workThreads more than once. An example of this is the Renderer thread, which may be run many times for a single MCT pass. Each thread is responsible for managing its list of J3dThreadData objects. In some embodiments, only the Renderer thread has more than one J3dThreadData object. It uses one J3dThreadData object for each View/Canvas3D pair for Rendering and one J3dThreadData object for each View/Screen3D pair for Swapping.

After the workThreads array has been allocated, updateWorkThreads( ) may be configured to fill in the array. As the J3dThreadData objects are added to the array, they have their various fields filled in. There are some thread run options that are used by the MCT to know how to manage the thread invocation. Some options are exclusive of other, while some may be combined.
In one embodiment the list of options include:

J3dThreadData.CONT_THREAD: Other threads may run while this thread is running.
J3dThreadData.WAIT_THIS_THREAD: Wait until this thread is done before allowing any other threads to run.
J3dThreadData.WAIT_ALL_THREADS: Wait for all currently running threads to complete before allowing any other threads to run.

One of the next two flags may be combined with the above flags.

J3dThreadData.START_TIMER: Start timing the frame associated with the given View.
J3dThreadData.STOP_TIMER: Stop timing the frame associated with the given view. Store the data in the View.

In filling the state array, the first thread in the array is the RenderingAttributeStructure update thread. It is first because there is only one for the whole system. Next, each universe's TransformStructure update thread is added. These need to be run early so that other threads may use their updated values. This completes section one of the update list. All threads in this section may run in parallel, but the update list does not continue until they are done. The next section of threads is a completion of the universe based update threads. So, for each universe, an update thread is added for the GeometryStructure, BehaviorStructure, RenderingEnvironmentStructure, and SoundStructure. All threads in this section may run in parallel, but no more update/work threads are run until they complete. This is because they will rely on the updates to these structures. The final set of update/work threads are a BehaviorScheduler for each universe, an InputDeviceScheduler for each PhysicalEnvironment, and for each View a RenderBin update thread and a SoundScheduler. These threads may also run in parallel.

The second dimension of the workThreads array is used for render threads. MCT allows parallel rendering to Canvas3D's that are on separate Screen3D's but that share the same View. To facilitate this, some data structures may be updated in the View when Canvas3D's are added and removed from a View. They consist of two ArrayLists. The first, the screenList, is a list of all Screen3Ds currently active. The second, the canvasList, is a list of ArrayLists. Each ArrayList in the list is a list of all Canvas3Ds on that Screen3D.

Figure 9:
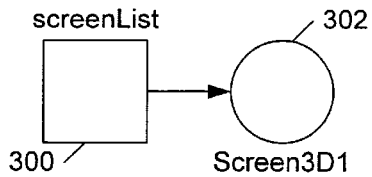
FIG. 9 is a diagram illustrating a number of example configurations for screen and canvas lists.
Figure 9:
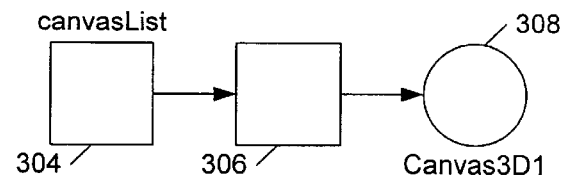
Figure 9:
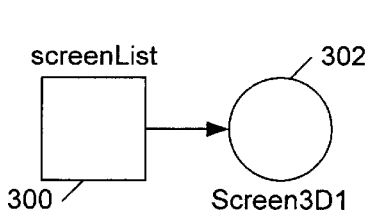
Figure 9:
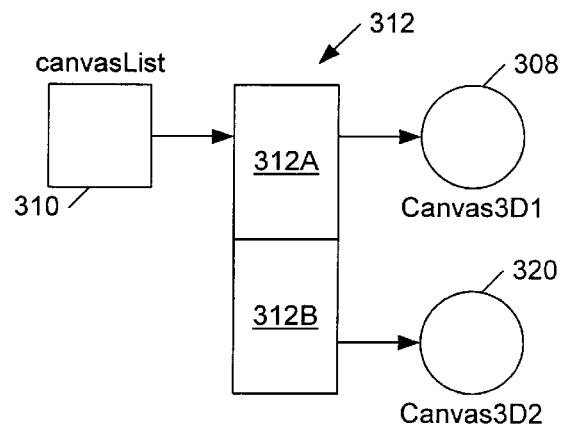
Figure 9:
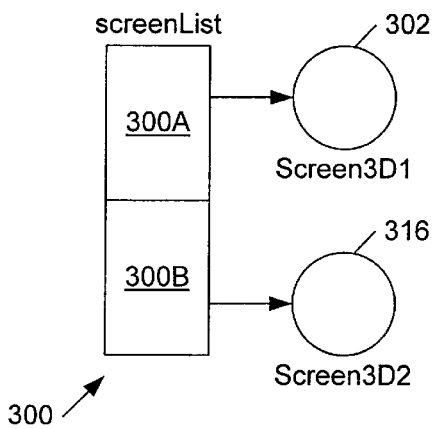
Figure 9:
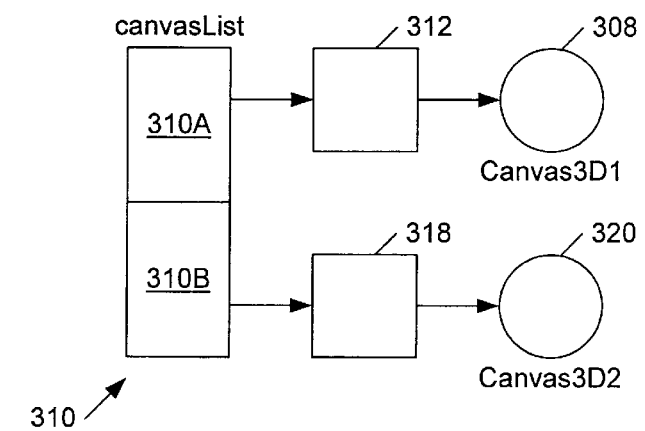

Turning now to FIG. 9, this structure is illustrated for three common cases. The first case is most common, having one Canvas3D (308) on one Screen3D (302). The second case has two Canvas3D's (308 and 320) on one Screen3D (302). The third case is two Canvas3D's (308 and 320) on two Screen3D's (302 and 316). The third case is one in which the system can render to the two canvases in parallel. The canvasList (310) is cached as a two dimensional array (310A–310B) of Canvas3D's, so it may be parsed quickly.

Returning to updateWorkThreads( ), the Renderers that need to be scheduled can be derived from this two dimensional array. Each entry in the canvasList is an array of Canvas3D's for that Screen3D. The length of the canvasList array is the total number of Renderers that may run in parallel. The longest array in canvasList is the total number of parallel Render groups that need to be scheduled. Since each Screen3D may have a different number of Canvas3D's on it, each parallel render group may not be the same size. All Render threads in a parallel render group, except the last one, have their thread options set to J3dThreadData.CONT_THREAD. The last one in the render group has its flag set to J3dThreadData.WAIT_ALL_THREADS, because it will wait for everyone in its group to finish. All of these Renderer invocations have two thread arguments, the operation to perform (Renderer.RENDER) and the Canvas3D to render into.

The next set of threads to be added to the workThreads render array is the Renderer threads that issue the swap buffers commands. There needs to be one thread invocation for each Screen3D in the View. This is directly gotten by iterating over canvasList again. All of these Renderer thread invocations, except the last one, gets its thread option set to J3dThreadData.CONT_THREAD since they can all run in parallel. The last Renderer gets its thread options flag set to J3dThreadData.WAIT_ALL_THREADS and J3dThreadData.STOP_TIMER since it will wait for all threads to finish and it will stop the View timer. The arguments that each Renderer receives are the operations to perform (Renderer.SWAP), the View, and the list of Canvas3D's that are to be swapped. The last entry in the render array is a render request thread. It is used to process offscreen rendering and immediate mode requests. At this point, the workThreads array has been updated. Once updateWorkThreads( ) has completed, updateThreadList( ) processes the list of zombie threads and kills them by calling J3dThread.finish( ). Now, MasterControl has a completely updated set of threads to schedule.

Time

As mentioned above, in one embodiment there are four times associated with each thread. First, there is lastUpdateTime. This is the last time that a message was sent to that thread. Each time a message is sent to a thread, this value is updated. Next is updateTime. This is a snapshot value of lastUpdateTime. The snapshot time is taken at the beginning of each MCT iteration. Finally, there are lastUpdateReferenceTime and updateReferenceTime. These times define the snapshot range of time values that are being processed on a given invocation of a thread. These are also taken at the beginning of each MCT iteration.

Returning to the flow of the MCT, once the workThreads list has been checked, MCT takes a time snapshot for the threads. This is done in updateTimeValues( ). There are two time values that are saved on each iteration, currentTime and lastTime. The variable currentTime is retrieved each time updateTimeValues( ) is called by calling getTime( ). The variable lastTime is the previous currentTime. For each snapshot, the time values between currentTime and lastTime define the current time range.

After the two time values are updated, each workThread is examined. Each thread's lastUpdateReferenceTime is set to lastTime, each thread's updateReferenceTime is set to currentTime, and each thread's updateTime is set to the thread's lastUpdateTime. If a thread's updateTime is greater than its lastUpdateReferenceTime, then it is flagged as a thread that needs to be run.

Running Threads

Once the time snapshot has happened, the MCT proceeds to run each thread. It uses runMonitor( ) to let each thread run while adhering to its run flags and giving render threads a higher priority. When a J3dThread is initialized, it immediately goes into its synchronized runMonitor( ) method and goes into a wait( ) state, waiting for notification from the MCT. When it is time to run a thread, the MCT goes into its own synchronized runMonitor( ) method and calls into the thread's runMonitor( ) method to notify( ) it and return.

At this point, the MCT can go into a number of states. If the thread run options indicate that it is to wait for this thread, the thread reference is stored, and the MCT keeps going into a wait( ) state until that thread's notify( ) indicates to the MCT that it is done. If the thread run options indicate that the MCT should wait for all threads to complete, the MCT repeatedly enters into a wait( ) state until all running threads are done. This is tracked by having a threadPending counter which represents the number of threads currently running. If neither of these options are set, the MCT may be configured to check to see if it is out of CPU resources. It does this by checking threadPending against the cpuLimit. If they are equal, the MCT goes into a wait( ) state until a thread completes. If none of these conditions are true, then the MCT advances to the next thread. Once all the threads have been processed, the MCT process the updateObject list, and then returns for another iteration.

Update Objects

When structures are processing their updates, it sometimes becomes necessary to modify a part of the structure that the Renderers are using. The structure cannot do the update when processing messages since the Renderers are most likely running at that time. In some implementations an interface called ObjectUpdate may be defined to address this issue. The interface call may be an interface that consists of a single updateObject( ) method. If an object finds that it needs to make a modification to itself for which the Renderer depends, the object implements this interface. When the modification becomes necessary, object adds itself to MasterControl's object update list. When MasterControl decides that it is safe to make modifications to render dependent structures, it calls the updateObfect( ) method for each object on its update object list. This is how the RenderingAttributesStructure, TransformStructure, RenderBin, and others process their render dependent modifications.

Frame Timer

One of the features that MasterControl implements is the View frame timing API. It does this by adding flags to the thread run options of the threads processed by the MCT. As the MCT iterates over each thread, it checks the thread's run flags. If the J3dThreadData.START_TIMER flag is set, the View is extracted from the thread arguments, the View's frameNumber is incremented, and the frameStartTime is retrieved by calling System.currentTimeMillis( ). Then the thread is allowed to run.

If the J3dThreadData.STOP_TIEER flag is set for the thread, the thread is allowed to run, then the View is extracted from the threads arguments, the stopTime for that View is recorded by calling System.currentTimeMillis( ), and the View.setFrameTimingValues( ) method is called. This synchronized method takes the frameNumber, startTime, and stopTime values and updates the.currentFrameNumber, currentFrameStartTime, currentFrameDuration, and frameNumbers and frameStartTimes circular buffers. When an application retrieves any of these values with the View API's, they go through synchronized methods to ensure that these values are stored and retrieved in an MT-SAFE manner.

Messages

As noted above, messages may be used to communicate information throughout the system. MasterControl is the keeper and distributor of messages in the system.

Whenever a message is needed, it is retrieved by calling VirtualUniverse.mc.getMessage( ). This MasterControl method first checks to see if the message freelist has any messages. If so, it recycles one of those messages. If not, it creates a new one and returns it. Once a component has a message, there are a number of fields that need to be filled in before it is sent into the system. The first field to be filled in is the universe. Next, the type of the message is filled in. All message types are found in the J3dMessage class. Then, the thread's bitmask is filled in. This is a bitmask of all thread types that need to be sent this message. All the possible thread types can be found in the J3dThread class. Finally, any arguments for the message need to be filled in. The maximum number of arguments is currently 5, but that number is arbitrary. Once, all the fields are complete, the message gets sent into the system by calling VirtualUniverse.mc.processMessage( ). There are two main types of messages that can be processed. There are messages that get sent to structures as well as notify work threads. And, there are messages that are only intended to notify a thread that it needs to run. If this latter case is all that is needed, the component may simply call VirtualUniverse.mc.sendRunMessage( ) to notify the threads specified in the arguments.

Sending Messages

When a message is sent to VirtualUniverse.mc.processMessage( ), it goes through the following steps. First, the time field of the message is filled in by getting a new time value via getTime( ). Next, each work thread that the message is destined to has its lastUpdateTime value set to the message's new time value. Then, any structure that this message is meant for is sent the message by calling J3dStructure.addMessage( ). Finally, MasterControl is notified that there is work to do.

Consuming Messages

Messages are sent to structures by MasterControl through its processMessages( ) method. It is the responsibility of the structure update methods to retrieve the messages. When a thread is notified to run by MasterControl, it receives two time values, lastUpdateTime and referenceTime. The time value lastUpdateTime is the last time value when a message was sent to this structure. It also gets a referenceTime, which is the reference time that the thread is to work in. For structures, this means that the update thread needs to consume all messages greater than or equal to lastUpdateTime but not greater than referenceTime.

When the structures processMessages( ) method gets called, the structure calls getMessages with the time range. This method returns all messages falling into that time range. A single message can go to many structures, so each message has a reference count. Each time the message is added to a structures message queue, its reference count is incremented. The last thing each structures processMessages( ) method performs is to call J3dMessage.decRefcount( ). When the reference count goes to 0, all its fields are nulled out and it gets put on the MasterControl message freelist.

Primary Views

MasterControl is also responsible for is assigning primary views for each VirtualUniverse. There are two cases when MasterControl can be called upon to do this. When a View becomes active, it checks to see if its VirtualUniverse has a primary View. If it does not, it calls VirtualUniverse.mc.assignNewPrimaryView( ). Also, when a View is deactivated, if it is the primary View for its VirtualUniverse, it calls VirtualUniverse.mc.assignNewPrimaryView( ). If the VirtualUniverse passed in has a primary view, it is one that is no longer active, so it sets that Views primaryview flag to false. Then it iterates over all active Views looking for one in the given VirtualUniverse. It stops when it finds the first one. If one is found, the View's primaryView flag is set to true and the VirtualUniverse's primary view is set to the one found. If one is not found, the VirtualUniverse's primary view is set to null.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A method for rendering graphics data, the method comprising:

receiving a scene graph, wherein the scene graph comprises a hierarchical group of objects;

generating a plurality of data structures separate from the scene graph, wherein each data structure corresponds to a particular type of object in the scene graph;

creating at least one thread that operates on each data structure, wherein at least a subset of the threads are configured to generate messages to communicate state changes to one or more of the data structures; and creating a master control thread configured to schedule the execution of the threads.

2. The method of claim 1, wherein the master control thread is configured to define a current epoch.

3. The method of claim 2, wherein said master control thread is configured to only schedule a particular thread for execution if the particular thread has received a message within the current epoch.

4. The method of claim 2, wherein said master control thread is configured to only schedule a particular thread for execution if the particular thread has received a message having a timestamp that falls within the current epoch.

5. The method of claim 4, wherein said epoch defines a minimum clock value and a maximum clock value.

6. The method of claim 3, wherein said master control thread is configured to only schedule a particular thread for execution if the particular thread has received a message having a counter value that falls within the current epoch.

7. The method of claim 6, wherein said current epoch defines a minimum counter value and a maximum counter value.

8. The method of claim 2, wherein said master control thread ensures that all messages older than the current epoch are processed before the current epoch begins.

9. The method of claim 1, wherein said master control thread manages which threads can be run in parallel.

10. The method of claim 1, wherein said master control thread manages CPU resources.

11. The method of claim 1, wherein said master control thread executes the threads scheduled for execution.

12. A computer program embodied on a computer-readable medium, wherein the computer program is configured to:

read a scene graph, wherein the scene graph comprises a hierarchical group of objects;

generate a plurality of data structures separate from the scene graph, wherein each data structure corresponds to a particular type of object in the scene graph;

create at least one thread that operates on each data structure, wherein at least a subset of the threads are configured to generate messages to communicate state changes to one or more of the data structures; and create a master control thread configured to schedule the execution of threads.

13. The computer program of claim 12, wherein the master control thread is configured to define an epoch.

14. The computer program of claim 13, wherein said master control thread is configured to only execute threads that have received messages that fall within the current epoch.

15. The computer program of claim 14, wherein said messages include a timestamp.

16. The computer program of claim 15, wherein said epoch defines a minimum clock value and a maximum clock value.

17. The computer program of claim 14, wherein said messages include a counter value.

18. The computer program of claim 17, wherein said epoch defines a minimum counter value and a maximum counter value.

19. The computer program of claim 13, wherein said master control thread ensures that all messages older than the current epoch are processed before the current epoch begins.

20. The computer program of claim 12, wherein said master control thread schedules two or more threads for parallel execution.

21. The computer program of claim 12, wherein said master control thread manages CPU resources.

22. The computer program of claim 12, wherein said master control thread executes the threads scheduled for execution.

23. A method for rendering a virtual world comprising a plurality of objects, wherein the method comprises:

creating a scene graph by defining a hierarchy of the objects;

generating one or more data structures separate from the scene graph, wherein each data structure corresponds to a particular type of object in the scene graph;

creating at least one thread that operates on each data structure, wherein at least a subset of the threads are configured to generate messages to communicate state changes to one or more of the data structures; and creating a master control thread configured to schedule the execution of each thread that has received one or more message.

24. The method of claim 23, wherein the master control thread is configured to define an epoch, wherein the master control thread is configured to only execute threads that have received messages that fall within the current epoch.

25. The method of claim 24, wherein said messages include a timestamp, and wherein said epoch defines a minimum clock value and a maximum clock value.

26. The method of claim 24, wherein said messages include a message counter, and wherein said epoch defines a minimum message counter value and a maximum message counter value.

* * * * *